United States Patent [19]

Tsau et al.

[11] Patent Number: 4,704,288
[45] Date of Patent: Nov. 3, 1987

[54] HEAT STABILIZED SWEETENER COMPOSITION CONTAINING APM

[76] Inventors: Josef H. Tsau, 5348 Brummel St., Skokie, Ill. 60077; James G. Young, 2729 Oak Ave., Northbrook, Ill. 60062

[21] Appl. No.: 33,853

[22] Filed: Dec. 19, 1986

Related U.S. Application Data

[63] Continuation of Ser. No. 633,182, Jul. 25, 1984, abandoned, which is a continuation-in-part of Ser. No. 531,327, Sep. 12, 1983, abandoned.

[51] Int. Cl.⁴ .......................... A23L 1/236; A23L 3/34
[52] U.S. Cl. ...................................... 426/99; 426/321; 426/548
[58] Field of Search ................... 426/548, 96, 99, 302, 426/307, 321, 804

[56] References Cited

U.S. PATENT DOCUMENTS

| | | | |
|---|---|---|---|
| 3,928,633 | 12/1975 | Shoaf et al. | 426/548 |
| 3,934,048 | 1/1976 | Furda et al. | 426/548 |
| 3,956,507 | 5/1976 | Shoaf et al. | 426/96 |
| 4,384,004 | 5/1983 | Cea et al. | 426/96 |
| 4,465,694 | 8/1984 | Okada | 426/99 |

FOREIGN PATENT DOCUMENTS

| | | | |
|---|---|---|---|
| 0053844 | 6/1982 | European Pat. Off. | 426/548 |
| 0097950 | 1/1984 | European Pat. Off. | 426/548 |
| 1511392 | 5/1978 | United Kingdom | 426/96 |

Primary Examiner—Elizabeth Weimar

[57] ABSTRACT

This invention encompasses a heat stabilized composition of aspartame, its salts or metal complexes and a partially hydrogenated vegetable oil melting at about 120° F. or above. This composition is particularly useful in baking applications for aspartame.

13 Claims, No Drawings

HEAT STABILIZED SWEETENER COMPOSITION CONTAINING APM

This application is a continuation of application Ser. No. 633,182, filed July 25, 1984, which is a continuation-in-part of Ser. No. 531,327, filed Sept. 12, 1983, both of which are abandoned.

BACKGROUND OF THE INVENTION

Aspartame (1-methyl N-L-α-aspartyl-L-phenylalanine) is a widely used sweetener. Its preparation and use are described in U.S. Pat. Nos. 3,492,131 and 3,642,491. FDA regulations 21 CFR 172.804(c)(3) provide that when aspartame is used as a sugar substitute for table use, its label shall bear instructions "not to use in cooking or baking." This label warning was required by the FDA because aspartame was found to be unstable when heated. For example, aspartame would decompose in typical baking situations such as making cakes, cookies, breads and the like.

This invention solves the problem of aspartame's instability during baking.

BRIEF DESCRIPTION OF THE INVENTION

Aspartame, salts and metal complexes thereof are protected during the baking process by coating the sweetener with a partially hydrogenated vegetable oil. It is important that the aspartame, salts or metal complexes thereof and partially hydrogenated vegetable oil be formed into 8–40 standard mesh* particle size, so that aspartame will be released in the later part of the baking cycle.

*Standard mesh refers to standard screens which pass particles with diameters of 2308 microns for 8 mesh, 840 micron for 20 mesh, 420 micron for 40 mesh, 177 micron for 80 mesh.

Preferably an aspartame sweetener is first granulated to 14 to 80 standard mesh sizes and most preferably to 14 to 30 standard mesh sizes and then are coated to form 8 to 40 standard mesh granules (with a partially hydrogenated vegetable oil). Thus the invention encompasses a heat stable sweetening composition comprising 8–40 mesh particles containing aspartame, salt or metal complexes thereof and 30–90% by weight of partially hydrogenated vegetable oil melting above 120° F.

The invention utilizes the principle that solid aspartame is significantly more stable than aspartame in solution. Coating with compatible fat will prevent aspartame from dissolving, thus stabilized, during preparation and baking. Both the type of the fat and the particle size of fat coated aspartame have been found to be critical. The melting point of the fat is also an important factor for both stabilizing aspartame in baking and making a granular product. This principle is also applicable to other artificial sweeteners such as saccharin and acesulfame K and combinations with aspartame.

DETAILED DESCRIPTION OF THE INVENTION

Aspartame (1-methyl N-L-α-aspartyl-L-phenylalanine) has the following chemical formula

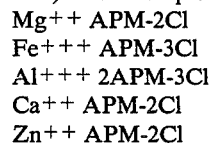

Salts of aspartame are also effective sweeteners of generally greater stability than aspartame itself. Typical salts are: sulfate, and lower alkyl sulfonate wherein the lower alkyl group contains 1–4 carbon atoms. Preferred salts are: Bis(hydrogen aspartyl phenylalanine methyl ester)sulfate represented by the formula $(APM.H)_2SO_4$; hydrogen aspartyl phenylalanine methyl ester methyl sulfonate, represented by the formula $(APM.H)SO_3CH_3$.

Metal complexes of aspartame are likewise more stable in the solid state than aspartame alone. Typical metal complexes are derived from pharmacologically acceptable metal ions and anions. Typical metal ions are $Ca^{++}$, $Zn^{++}$, $Mg^{++}$, $Al^{+++}$, $Fe^{++}$ and $Fe^{+++}$ and typical anions are chloride, acetate, sulfate, and phosphate. Preferred aspartyl phenylalanine methyl ester (APM) metal complexes are:

$Mg^{++}$ APM-2Cl
$Fe^{+++}$ APM-3Cl
$Al^{+++}$ 2APM-3Cl
$Ca^{++}$ APM-2Cl
$Zn^{++}$ APM-2Cl

It has been found that aspartame, its salts and metal complexes can be protected by fats during the baking cycle, particularly by partially hydrogenated vegetable oils melting above 120° F.

Partially hydrogenated triglyceride vegetable oils such as soybean, palm, cottonseed oils melting above 120° F. are preferred fats useful in practicing the invention. Typically about 3–9 parts by weight of fat are used to coat 7–1 parts by weight of APM, its salts or metal complexes.

The APM, its salt or metal complex is coated with fat by either melting the fat and adding APM or by intermixing APM and fat prior to melting the fat. The fat is allowed to harden and the mass of fat coated particles is filtered through standard mesh screen to obtain fat coated APM particles in the size range of 8–40 standard mesh or about 2380 to 420 microns.

An ideal coating is not only compatible with aspartame but also has a melting point about 100° C. to release aspartame until the end of baking cycle. However, a mechanism other than melting fat is needed to slow down the release of aspartame during baking. This can be accomplished by increasing fat coating thickness and/or the particle size of the baking product to increase the diffusing time of the melted fat into the matrix of cake.

Therefore, particle size is important because it provides controlled release of APM at the end of the baking cycle. If the particle size is too small, the APM will be released early in the baking cycle and will be thermally decomposed. If the particle size is too large, sweetness will not be thoroughly released and distributed. Therefore, the particle size, the type and the melting pint of the fat are critical.

It has been found advantageous to include acidic polydextrose with the APM during the fat coating process when the product will be used to sweeten baked goods with high pH environment such as a chocolate cake. The polydextrose is in the amount of 3 to 8 parts of APM.

The invention is further illustrated by the following examples which are intended to illustrate the invention and not limit it in spirit and scope.

EXAMPLE 1

Granule Preparation

Method I 30 parts of partially hydrogenated triglyceride soy bean oil melting at 151°-158° F. is melted in a flat bottom pan. 10 parts of aspartame (APM) is gradually added so the powder is coated by the melted oil. Heating is discontinued and 60 parts of polydextrose powder is dispersed in the melted oil by stirring. The mass is stirred during solidification to produce small granules. The granules are separated on a standard 20 mesh screen. This method is applicable when using 10-30 parts of fat.

Method II

Polydextrose—aspartame non-porous granules[a] are made by adding a solution of 400 parts of polydextrose dissolved in 150 parts by volume of hot water to 600 parts of aspartame with stirring and drying by heating until substantially dry granules are formed. The granules are passed through a 30 standard mesh screen.

[a]The porous granules were prepared by mixing APM with granulating compounds, such as polydextrose or maltrin M100, and water or water-alcohol mixture to make a dough, which was expanded and dried in vacuum oven at 80° C. The dried product was then milled to granular powder.

Method III 3 parts of APM and 2 parts of polydextrose were mixed and granulated in a high-speed stirring granulator using water (6-10% by weight) granulation solvent and heat to facilitate granulation. The granules were tray dried and screened to 14-30 mesh size distribution. The above granule was coated with 50% Duratex using a fluid-bed granulator which has a heating and pumping system to melt and spray high melting point fats. Part of the coated granules were screened to 12-30 mesh and 16-30 mesh samples.

These granules are coated with fat by mixing 50 parts of the granules with 50 parts of fine powder fat and slowly heating with stirring until the granules are coated. The coated granules are passed through both 10 and 20 standard mesh screen.

Both Methods I, II and III are applicable when no polydextrose is used. For example, aspartame may itself by granulated or mixed with other granulating agents.

The heat stabilized compositions of the present invention may be utilized as in one or more of the following Examples.

EXAMPLE 2

The formulations of cakes used in the following examples:

| Ingredient | Yellow Cake* APM | Yellow Cake* SUGAR | Chocolate Cake APM | Chocolate Cake SUGAR |
|---|---|---|---|---|
| Sugar | — | 200 | — | 206 |
| Aspartame | 1.2 | — | 1.2 | — |
| Maltrin M100 | 115 | — | 200 | — |
| Flour | 154 | 165 | 147 | 147 |
| Cocoa Powder | — | — | 56 | 56 |
| Baking Powder | 6.8 | 6.8 | 1.2 | 1.2 |
| Baking Soda | — | — | 3.1 | 3.3 |
| Salt | 3.4 | 3.5 | 3.6 | 3.6 |
| Shortening | 50 | 55.6 | 36 | 42 |
| Water | — | — | 92 | 92 |
| Milk | 194 | 180 | — | — |
| Buttermilk | — | — | 99 | 99 |
| Egg | 54 | 70 | 54.5 | 54.5 |
| Vanilla | 3.1 | 4.2 | 1.8 | 1.8 |

*Polydextrose- APM yellow cake: The same as APM yellow cake except Maltrin M100 is replaced by the same amount of polydextrose.

EXAMPLE 3

Compatibility between different types of fats and APM compounds.

The following results were obtained by the analysis of fat coated samples. Unheated samples were used as controls to determine high-temperature compatibility. For all samples the weight ratio used was 9:1 (fat:APM compound). The samples were heated at 110° C. for 40 minutes. APM was extracted from a fat coated sample using solvent-solvent (0.01N HCl—methylene chloride) extraction and determined by an High Performance Liquid Chromatographic (HPLC) method.

| Composition (wt ratio) | APM Content (%) Control Sample | APM Content (%) Heated Sample | % Degradation |
|---|---|---|---|
| Duratex(9), APM(1) | 9.96 | 9.33 | 6.3 |
| Durkee 17(9), APM(1) | 10.40 | 8.40 | 18.7 |
| KLX(9), APM(1) | 10.20 | 8.50 | 16.7 |
| Aratex(9), APM(1) | 9.60 | 9.74 | 0 |
| Kaomel(9), APM(1) | 9.84 | 8.74 | 11.2 |
| Duratex(9), (APM.H)$_2$SO$_4$(1) | 7.32 | 7.24 | 1.1 |
| Atmos K150(9), APM(1) | 9.25 | 3.92 | 57.6 |
| Myverol(9), APM(1) | 9.60 | 0 | 100 |
| Glycerol Monosterate(9), APM(1) | 7.65 | 2.23 | 70.9 |
| Stearic Acid(9), APM(1) | 9.36 | 0 | 100 |
| Stearic Acid(9), (APM.H)$_2$SO$_4$ | 8.37 | 2.60 | 68.9 |

This study demonstrates that triglyceride fats have the best compatibility with APM compounds at high temperature and are preferred for use in coatings.

EXAMPLE 4

Temperature profiles of cakes during baking.

The temperature inside of a cake during baking was monitored and recorded every minute using a thermocouple inside the cake.

Results show that at the end of 40 minutes baking period the cake temperature plateaus at ~112°-120° C. Therefore, the maximum temperature of a baking cake is significantly lower than the degradation temperatures of APM (160° C.), (APM.H)$_2$SO$_4$ (180° C.), and APM.CaCl$_2$ (~175° C.) in solid form. Therefore, if these sweeteners can be kept in solid form, e.g., by fat coating to prevent them from dissolving in water, they are stabilized during baking.

EXAMPLE 5

Summary of assay results by an HPLC method for yellow cup cakes.

| Spl No. | Composition of Sweetener (wt ratio) | Coating Method Particle Size (mesh) | APM Recovered (%) | % Degradation DKP* | % Degradation AP* | Relative Recovery % of APM | Remark |
|---|---|---|---|---|---|---|---|
| 1. | APM | | 38.3 | 30.5 | 8.7 | 49.4 | Control |
| 2. | APM | | 31.1 | 34.1 | 8.5 | 42.2 | Control |
| 3. | APM(1), Durkee 17(3), Polydextrose(6) | I/≦20 | 62.2 | 25.0 | 3.4 | 68.7 | |
| 4. | APM(1), Duratex(3), Polydextrose(6) | I/≦20 | 53.2 | 20.3 | 2.9 | 69.6 | |
| 5. | APM(1), KLX(3), Polydextrose(6) | I/≦20 | 56.7 | 32.4 | 4.6 | 60.5 | |
| 6. | (APM.H)$_2$SO$_4$(1), Durkee 17(3), Polydextrose(6) | I/≦20 | 50.1 | 14.5 | 3.2 | 73.9 | |
| 7. | APM.CaCl$_2$(1), Durkee 17(2), Polydextrose(5) | I/≦20 | 50.1 | 15.2 | 3.3 | 73.0 | |
| 8. | (APM.H)$_2$SO$_4$.(3), Durkee 17(8), Polydextrose(12) Maltrin M100(2) | I/≦20 | 45.2 | 14.4 | 2.8 | 72.4 | |
| 9. | Granule A [(APM.H$_2$SO$_4$(3), Polydextrose(3), Maltrin M100(4)] | /≦30 | 40.8 | 27.5 | 7.2 | 54 | Control |
| 10. | Granule A(2), Duratex(3) | II/≦10 | 61.8 | 16.3 | 3.3 | 75.9 | |
| 11. | Granule B [APM(1), Polydextrose(2), Maltrin M100(2)](1), Duratex(1) | II/≦10 | 52.0 | 28.2 | 4.2 | 61.6 | |
| 12. | Granule C [(APM.H)$_2$SO$_4$(1.1), Polydextrose(1), Maltrin M100 (1)](5), Duratex(3) | II/≦20 | 60.5 | 13.7 | 1.6 | 79.8 | |
| 13. | Granule C(1), Duratex(1) | II/≦20 | 61.9 | 15.2 | — | ~80.3 | |
| 14. | Granule C(1), Duratex(1) | II/≦10 ≧20 | 68.5 | 12.2 | — | ~84.9 | |
| 15. | Granule C(2), Duratex(3) | II/≧20 ≦10 | 60.3 | 23.5 | 2.71 | 69.7 | |
| 16. | Granule C(1), Duratex(1)- Polydextrose Cake | II/≧20 ≦10 | 80.1 | 11.7 | | 87.2 | The cake has a sour and bitter taste |

*DKP is diketopiperazine degradation product of APM.
**AP aspartyl phenylalanine, a minor thermal degradation product of APM.

The above results indicate that:
(1) The combination of fat coating and a micro-environment of polydextrose, which is acidic, has enhanced the stability of APM in baking by 20% or more.
(2) Using compounds such as (APM.H)$_2$SO$_4$ and APM.CaCl$_2$, which have better thermal stability than APM, instead of APM has significantly reduced the degradation to DKP.
(3) The higher melting fats, Durkee 17 and Duratex, are somewhat better than the lower melting one, KLX.
(4) In the studies with Granule C the best results are obtained with a 50% Duratex coating and a uniform particle size between 20 and 10 mesh.

EXAMPLE 6

Summary of assay HPLC results for APM in chocolate cupcakes.

| Spl No. | Composition of Sweetener (wt ratio) | Coating Method Particle Size (mesh) | APM Recovery (%) | % Degradation DPK* | Relative Recovery % of APM | Remark |
|---|---|---|---|---|---|---|
| 1. | APM | | 11.0 | 46.5 | ~19.1 | Control |
| 2. | APM | | 17.1 | 63.6 | ~21.2 | Control |
| 3. | Granule B [APM(1), Polydextrose(2), Maltrin M100(2)](1), Duratex(1) | II/≦10 | 26.0 | 45.1 | ~36.6 | |
| 4. | Granule A [(APM.H)$_2$SO$_4$(3), Polydextrose(3), | /≦30 | 13.1 | 53.1 | ~19.8 | Control |

-continued

| Spl No. | Composition of Sweetener (wt ratio) | Coating Method Particle Size (mesh) | APM Recovery (%) | % Degradation DPK* | Relative Recovery % of APM | Remark |
|---|---|---|---|---|---|---|
| 5. | Maltrin M100(4)] Granule A(2) Duratex(3) | II/≦10 | 30.4 | 42.0 | ~42.0 | |
| 6. | APM.CaCl₂(1) Durkee 17(2), Polydextrose(5) | I/≦10 | 40.4 | 38.9 | ~50.9 | |
| 7. | Granule C [APM.H₂SO₄(1.1), Polydextrose(1) Maltrin M100(1)](5) Duratex(3) | II/≦20 | 40.2 | 40.1 | ~50.1 | |
| 8. | Granule C(3) Duratex(1) | II/≦20 | 46.0 | 47.6 | ~49.1 | |
| 9. | Granule C(1), Duratex(1) | II/≧20 ≦10 | 67.2 | 34.2 | 66.3 | |
| 10. | Granule C(2), Duratex(3) | II/≧20 ≦10 | 59.5 | 30.2 | 66.3 | |

The results show that:
(1) significantly increased APM surviving rates were found in all cakes using fat-coated APM sweetener.

(2) the effects of both coating thickness and particle size on APM surviving rate in chocolate cake is even more profound than in yellow cake (Spl Nos. 8, 9, and 10).

(3) the optimum results found for granule C samples are 50% fat-coating with a uniform particle size between 20 and 10 mesh, as used in yellow cake.

EXAMPLE 7

Sensory evaluation results.

Cupcakes made with different APM samples and baked simultaneously were evluated for sweetness by 7 or more panelists.

| Study No. | Cake | Composition of sweetener | Coating Method Particle Size (mesh) | Sweeter | Less Sweet | Least Sweet | Equal Sweet |
|---|---|---|---|---|---|---|---|
| 1 | Choc. | (APM.H)₂SO₄(1), Durkee 17(3), Polydextrose(6)-Spl A. | I/≦20 | 1 | 7 | — | 2 |
| | | (APM.H)₂SO₄.CaSO₄(3), Durkee 17(3), Polydextrose(12), Maltrin M100(2)-Spl B | I/≦20 | 7 | 1 | — | 2 |
| 2 | Yell. | Spl A | I/≦20 | 3 | 2 | — | 4 |
| | | Spl B | I/≦20 | 2 | 3 | — | 4 |
| 3 | Yell. Polydex-trose-APM | Spl A | I/≦20 | 10 1 | 1 10 | | |
| | | Comments: 5 noticed sourness in the cake with polydextrose. | | | | | |
| 4 | Yell. | Granule C [APM.H₂SO₄(1.1), Polydextrose(1) Maltrin M100 (1)](5) Duratex(3) | II/≦20 | 3 | 5 | — | 2 |
| | | sugar | | 5 | 3 | — | 2 |
| 5 | Choc. | Granule C(2), Duratex(3) | II/≦10 ≧20 | 2 | 7 | — | 1 |
| | | Sugar | | 7 | 2 | | |
| 6 | Choc. | Granule C(1), Duratex(1) | II/≦10 ≧10 ≦20 | 6 | 1 | | |
| | | Granule D [APM(1), polydextrose(2) Maltrin M100(2)](1), Duratex(1) | II/≦20 | 1 | 3 | 2 | 1 |
| | | Granule D(1), Duratex(1) | II/≦10 ≧20 | | 2 | 4 | 1 |

The above results indicate
(1) In baking, the stability of fat-coated (APM.H)₂SO₄.CaSO₄ compares favorably to that of (APM.H)₂SO₄.
(2) A yellow cake made with (APM.H)₂SO₄ coated with Durkee 17 is significantly sweeter than a polydextrose-APM yellow cake.
(3) Cakes, both yellow and chocolate, made with fat-coated APM samples have sweetness and texture comparable to those of sugar cakes.

(4) The chocolate cake made with coated (APM.H)$_2$SO$_4$ is sweeter than that made with coated APM.

EXAMPLE 8

Baking stability of Duratex coated non-porous APM-polydextrose granulates.

| Study No. | Cake | Composition of Sweetener | Coating Method Particle Size (mesh) | APM Recovery (%) | % Degradation DKP | % Relative APM Recovery |
|---|---|---|---|---|---|---|
| | Yell. | ***Granule E [(APM(25), Polydextrose(15.6), Duratex(59.4)] | II/≧20 ≦10 | 70.6 | 11.0 | 86.5 |
| | Choc. | ***Granule E | II/≧20 ≦10 | 68.5 | 24.4 | 73.7 |
| | Yell. | ***Granule F [APM(34.4), Polydextrose(15.6), Duratex(40.6)] | II/≦20 | 73.5 | 20.6 | 78.1 |
| | Choc. | Granule F | II/≦20 | 63.6 | 38.2 | 62.5 |

***APM-polydextrose granules passed through No. 30 mesh screen.

The above results clearly indicate that larger particle size and thicker coating improve APM baking stability and these factors are particularly important for chocolate cakes.

This example demonstrates that APM dissolves significantly slower than its salts and complexes and this can be utilized as an important advantage for stabilizing APM in baking. The slow-dissolving factor can be enhanced by increasing particle size of APM. Therefore, Duratex coated APM granulates exhibit significantly better stability over Duratex coated APM powder.

DESCRIPTION OF TRADEMARK GOODS

Maltrin M100 sold by Grain Processing Corporation is a spray dried hydrolyzed carbohydrate made from corn starch having a D.E. (Dextrose Equivalent) range of 9-12.

Polydextrose sold by Pfizer Chemical Division is randomly bonded condensation polymer of dextrose containing minor amounts of bound sorbital and citric acid.

Duratex sold by Durkee Industrial Foods is partially hydrogenated cottonseed triglyceride oil CMP of 141°-147° F.

Durkee 17 sold by Durkee Industrial Foods is partially hydrogenated triglyceride soybean oil CMP 152°-158° F.

KLX sold by Durkee Industrial Foods is partially hydrogenated vegetable oil (mixture of cottonseed and soybean oil triglycerides) CMP 124°-130° F.

Aratex sold by Durkee Industrial Foods is partially hydrogenated vegetable oil which is a mixture of cottonseed, soybean, and palm oil triglycerides.

Kaomel sold by Durkee Industrial Foods is partially hydrogenated vegetable oil, CMP 97°-101° F.

Atmos K150 sold by ICI is a mixture of mono- and diglyceride fats with a melting point range 135°-142° F.

Myverol sold by Eastman contains mainly (90%) monoglyceride fats with a melting point range 154°-163° F.

APM-calcium complex, 1:1

Grind CaCl$_2$.2H$_2$O crystal to fine powder. Thoroughly mix well 20.0 g APM and 10.0 g CaCl$_2$.2H$_2$O. Add slowly with stirring 300 ml of 200 proof alcohol preheated to ~60°-70° C. The solids should be almost completely dissolved. Filter quickly by suction. Let the solution cool down to room temperature and then cool in refrigerator. Filter to collect precipitated product. Dry under vacuum and heat (~60° C.) overnight.

(APM.H)$_2$SO$_4$.CaSO$_4$

An amount of calcium bisulfate is dissolved or dispersed in small amount of distilled water. Alternatively, suitable amounts of calcium sulfate and sulfuric acid can be used to prepare the corresponding bifulfate, in situ, in water. An amount of APM is then added and dissolved with gentle heating and stirring. The amounts used should meet the stoichiometry of APM:Ca++:H$_2$SO$_4$=2:1:1. An amount of organic solvent, such as alcohol and isopropanol, about 10 to 20 times the volume of water used, preheated to about 60° C., is then added. The product will form suddenly as crystalline precipitate after 1 to 10 minutes of gentle heating and stirring.

(APM.H)$_2$SO$_4$

Sulfuric acid (96%, 1.66 g) was dissolved in distilled water (40 ml) and heated to about 40°. To this solution was added aspartame (10.0 g) and the mixture was stirred. After the ester had dissolved to produce a clear solution, ethanol (400 ml), warmed to about 60°, was added with stirring. The solution was quickly filtered and the filtrate cooled to about 5° to precipitate the sulfate salt, filtered, washed with cold ethanol and dried in a vacuum at about 50° for about 2 hours to yield about 11 g of the above-titled salt.

Examples of the sulfonate salts of the invention were prepared using the foregoing procedure and substituting the appropriate organic sulfonic acid (RSO$_3$H) for sulfuric acid.

What is claimed is:

1. A sweetening composition comprising 8-40 standard mesh particles containing aspartame (APM), salts, or metal complexes thereof, and 30-90% by weight of a partially hydrogenated vegetable oil melting about 120° F. or above wherein the composition is useful in baking applications.

2. The composition according to claim 1 containing aspartame (APM).

3. The composition according to claim 1 containing aspartame (APM.H)$_2$SO$_4$.

4. The composition according to claim 1 containing aspartame (APM.H)$_2$SO$_3$CH$_3$.

5. The composition according to claim 1 containing aspartame (APM.H)$_2$SO$_4$.CaSO$_4$, (APM.H)$_2$SO$_4$2-

.CaSO$_4$, (APM.H)$_2$SO$_4$.MgSO$_4$, or (APM.H)$_2$SO$_4$.2MgSO$_4$.

6. The composition according to claim 1 containing CA++(APM)2Cl−.

7. The composition according to claim 1 further containing polydextrose.

8. The composition of claim 1 wherein the particles are 14–80 standard mesh size granules containing aspartame which are coated with partially hydrogenated vegetable oil melting about 120° F. or above to form particles of 8–40 standard mesh.

9. The composition according to claim 8 werein the particles are 14–30 standard mesh size granules containing aspartame which are coated with partially hydrogenated vegetable oil melting about 120° F. or above to form particles of 8–40 standard mesh.

10. The composition according to claim 9 wherein the 14–30 standard mesh size granules are made of aspartame and polydextrose.

11. A method for stabilizing aspartame for use in baking applications comprising coating aspartame containing granules of 14–80 standard mesh size with partially hydrogenated vegetable oil melting about 120° F. or above to provide particles of 8–40 standard mesh.

12. The method of claim 11 wherein the aspartame containing granules additionally contain polydextrose.

13. The method of claim 12 wherein the coated stabilized aspartame granules contain from about 30 to about 90% by weight of hydrogenated vegetable oil melting above 120° F.

* * * * *